United States Patent [19]
Collura

[11] 4,027,652
[45] June 7, 1977

[54] SOLAR ENERGY COLLECTOR
[76] Inventor: Frank Collura, 2926 W. Jean St., Tampa, Fla. 33610
[22] Filed: Apr. 15, 1975
[21] Appl. No.: 568,188
[52] U.S. Cl. ............................................. 126/271
[51] Int. Cl.² ........................................... F24J 3/02
[58] Field of Search .......... 126/270, 271; 237/1 A; 165/171

[56]        References Cited
        UNITED STATES PATENTS

| 2,594,232 | 4/1952 | Stockstill | 126/271 |
| 2,676,001 | 4/1954 | Polad | 165/171 |
| 2,703,702 | 3/1955 | Meinel | 165/171 |
| 3,048,375 | 8/1962 | Walker | 126/270 |

FOREIGN PATENTS OR APPLICATIONS

| 1,085,457 | 10/1967 | United Kingdom | 165/171 |

Primary Examiner—John J. Camby
Assistant Examiner—Larry I. Schwartz
Attorney, Agent, or Firm—Clarence A. O'Brien; Harvey B. Jacobson

[57]                ABSTRACT

A plurality of side-by-side thin heat-absorbing metal strips are provided and a plurality of cylindrical pipe sections underlie the strips and are interconnected to define a continuous liquid flow path through the pipe sections. The metal strips comprise recycled aluminum can bodies and are arched over and disposed in good heat transfer relation with adjacent portions of the pipe sections opposing the strips. The arching of the strips being such as to closely conform to the radii of curvature of the adjacent pipe sections and establish a wide area of good heat transfer relationship between the strips and the adjacent pipe section portions.

10 Claims, 11 Drawing Figures

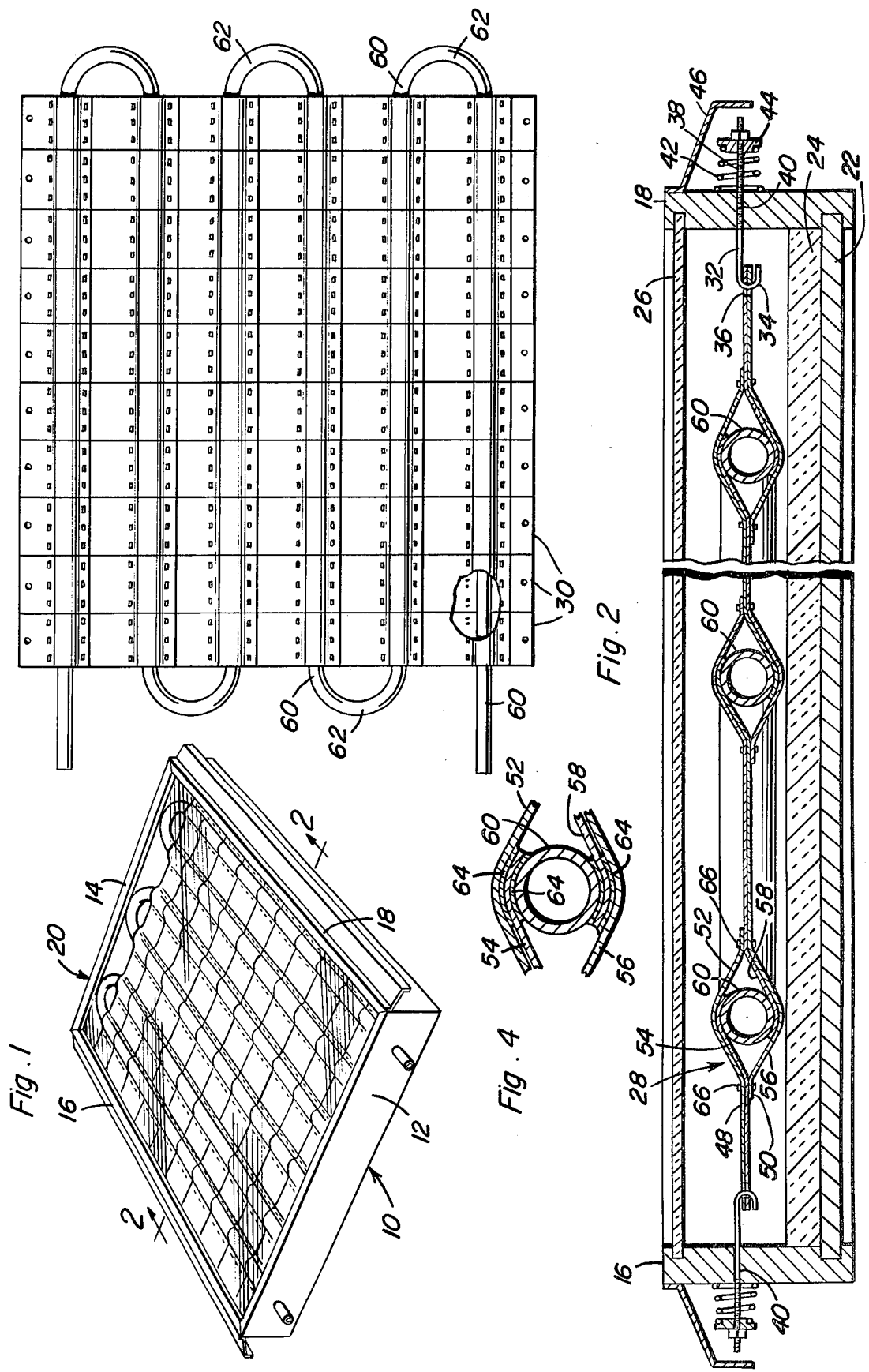

SOLAR ENERGY COLLECTOR

BACKGROUND OF THE INVENTION

Various types of solar energy collectors of the type using thin strips of metal have been heretofore designed. However, most of these previously designed solar energy collectors have, for one reason or another, been unnecessarily expensive to produce and, in some instances, not as efficient as they might be in collecting solar energy. Some of these previous types of solar collectors are disclosed in U.S. Pat. Nos. 1,125,113, 1,753,227, 3,135,323, 3,039,453 and 3,464,402.

BRIEF DESCRIPTION OF THE INVENTION

The solar energy collector of the instant invention relates to a solderless connector whereby thermal contact is assured by mechanical means and by the use of multi-layers of thin similar (or dissimilar) metals for the solar energy absorbing panel, instead of a standard thicker energy-absorbing panel.

Serious attention is now being given to solar energy due to the recent energy crisis and air pollution problems. Small solar collectors have been in limited use for some time in which water conductive tubes are soldered to a metal backing plate and such small solar energy collectors might range up to 40 or 50 square feet in plan area. Presently, designers of solar energy collectors are contemplating collectors which may be from 5 to 1,000 square feet or more in plan area and such solar energy collectors are capable not only of furnishing hot water for winter heating but are also capable of providing sufficient heat for absorption type air conditioning.

The main object of this invention is to provide a solar energy collector heat absorption back plate of universal design and which may be used in conjunction with liquid conveying tubes of substantially any diameter, length and material and therefore for solar energy collectors of substantially any capacity.

A further object of this invention is to provide a solar energy collector which will have a high degree of efficiency.

Another object of this invention, in accordance with the immediately preceding object, is to provide a solar energy collector which may be constructed from readily available materials.

Yet another object of this invention is to provide a solar energy collector whose component parts may be readily assembled at the site of use by substantially semi-skilled personnel.

Another important object of this invention is to provide a solar energy collector constructed in a manner whereby maintenance thereon after the solar energy collector has initially been erected will be maintained at a minimum.

Still another important object of this invention is to provide a solar energy collector heat absorption back plate of a design which will enable the use of discarded aluminum in its construction.

A final object of this invention to be specifically enumerated herein is to provide a solar energy collector in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a small solar energy collector constructed in accordance with the present invention;

FIG. 2 is an enlarged fragmentary vertical sectional view taken substantially upon the plane indicated by the section line 2—2 of FIG. 1;

FIG. 3 is an enlarged plan view of the solar energy collecting panel assembly of the solar energy collector illustrated in FIG. 1;

FIG. 4 is a fragmentary vertical sectional view illustrating the manner in which one of the pipe sections of the solar energy collector is secured between bowed-apart plies of the strips which form the solar energy collecting panel portion of the collector;

DETAILED DESCRIPTION OF THE INVENTION

Figure 7:
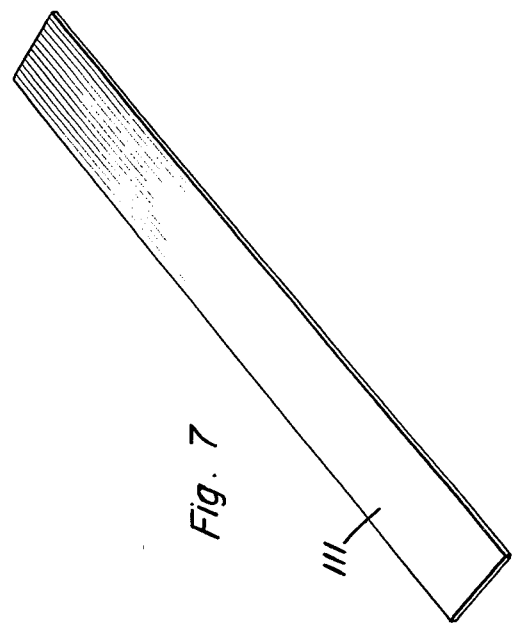
FIG. 7 is a perspective view of one of the metal strip sections of the solar energy collector illustrated in FIGS. 5 and 6.

Referring now more specifically to the drawings, the numeral 10 generally designates a solar energy collector constructed in accordance with the present invention. The collector 10 includes a housing having opposite end walls 12 and 14 interconnected at corresponding end portions thereof by means of opposite side walls 16 and 18. The housing defined by the walls 12, 14, 16 and 18 is referred to in general by the reference numeral 20 and includes a lower wall or panel 22 extending between the lower marginal edge portions of the walls 12, 14, 16 and 18. The upper surface of the lower wall 22 is covered by an insulative panel 24 and a heat insulative transparent panel 26 extends between and is supported from the upper marginal edge portions of the walls 12, 14, 16 and 18.

A solar energy collector panel referred to in general by the reference numeral 28 is disposed within the housing 20 and consists of a plurality of side-by-side thin metal strips 30 extending between the side walls 16 and 18 and anchored to the corresponding side walls by means of spring-biased J-shaped hooks 32 having their hooked end portions 34 passed through apertures 36 provided therefor in the corresponding ends of the strips 30 and the shank portions 38 slidingly received through small diameter bores 40 formed in the side walls 16 and 18. The hooks 32 are spring-biased to outermost positions relative to the corresponding side walls by means of compression springs 42 disposed about the outwardly projecting ends of the shanks 38 and between the outer surface portions of the corresponding side walls and abutment members 44 carried by the outer terminal ends of the shank portions 40. In addition, the exposed ends of the shank portions 38 and the compression springs 42 are covered by shields 46 carried by the corresponding side walls 16 and 18.

Each of the strips 30 includes a pair of plies 48 and 50 and the ply 48 includes end overlapped ply sections 52 and 54 while the ply 50 includes end overlapped ply sections 56 and 58. The portions of the plies 48 and 50 defined by the overlapped end portions of the plies 52 and 54 and the plies 56 and 58 are spread apart and receive a plurality of pipe sections 60 therebetween and pairs of adjacent ends of the pipe sections 60 are joined by integral U-shaped bends 62 in order to define a continuous water passage. Further, as may best be seen from FIG. 4 of the drawings the ply sections 54 and 58 are disposed in excellent heat-transfer relation with the pipe sections 60 by means of a silicone heat sink compound 64 such as No. 340 Heat Sink Compound produced by Dow Corning. Further, the overlapped ply sections 52 and 54 as well as the overlapped ply sections 56 and 58 also have the compound 64 disposed therebetween.

The various plies 48 and 50 are secured together on opposite sides of each pipe section 60 by any suitable means such as spot welding or standard fasteners including staples or rivets 66 and those surfaces of the various ply sections 52 and 54 facing the transparent panel 26 may be of a dark color so as to absorb a maximum amount of solar energy incident thereon.

The interior sides of the side walls 16 and 18 as well as the interior sides of the end walls 12 and 14 may also be covered by means of an insulative panel, if desired. Of course, operation of the solar energy collector 10 is reasonably simple in that water is caused to flow through the pipe sections 60 and thus to absorb an appreciable amount of the solar energy incident upon the strips 30.

Figure 5:
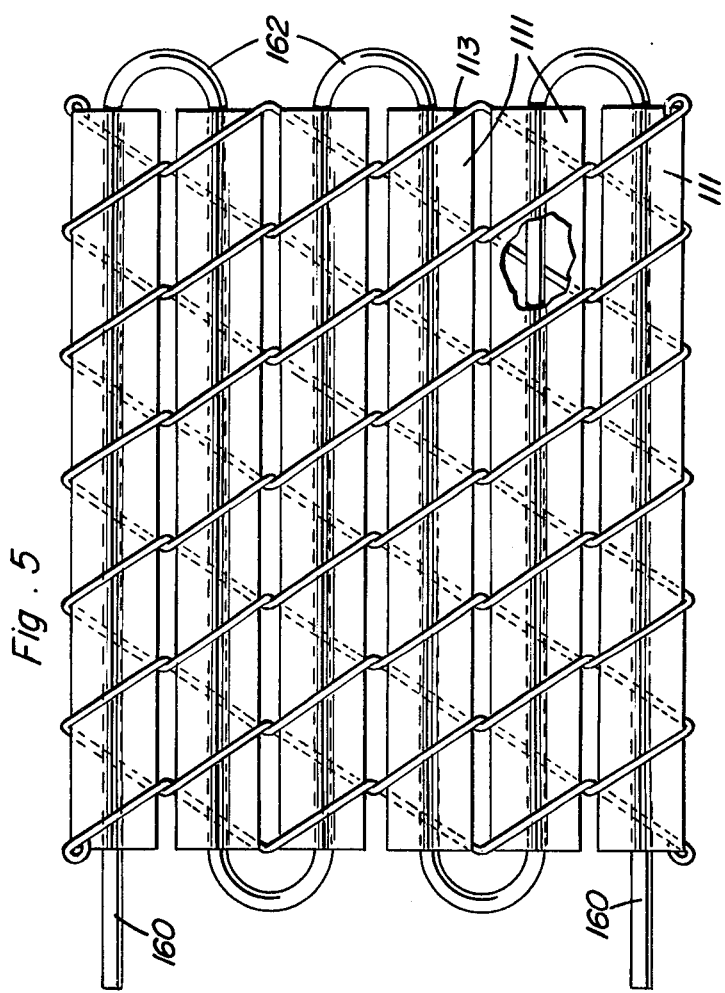
FIG. 5 is a plan view similar to FIG. 3 but of a modified form of solar energy collector panel structure utilizing a supportive structure for the metal strips and pipe sections in the form of a woven wire mesh fabric.
Figure 6:
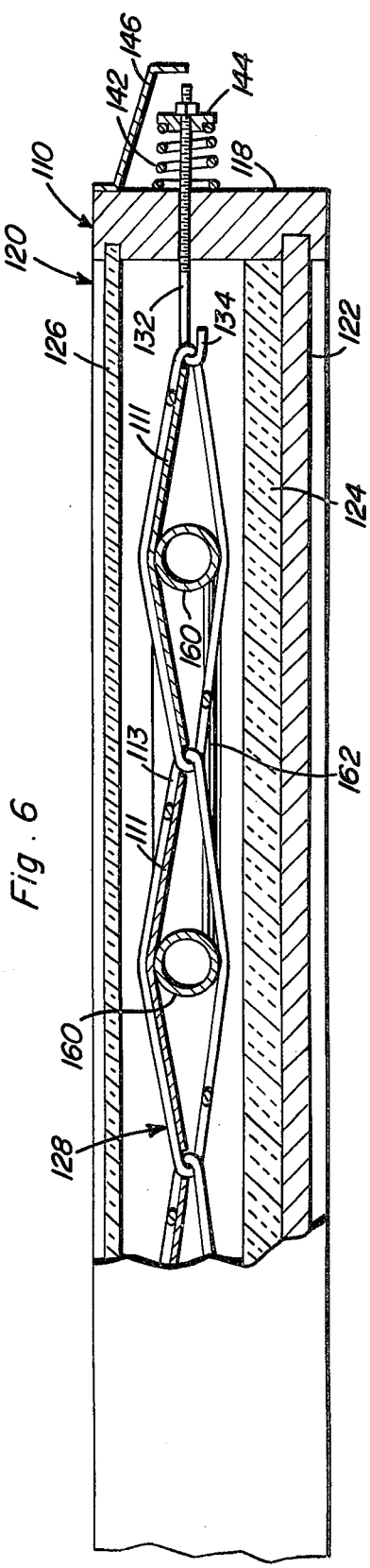
FIG. 6 is a fragmentary vertical sectional view similar to FIG. 2 and illustrating a solar energy collector utilizing a solar energy collecting panel assembly such as that illustrated in FIG. 5.
Figure 10:
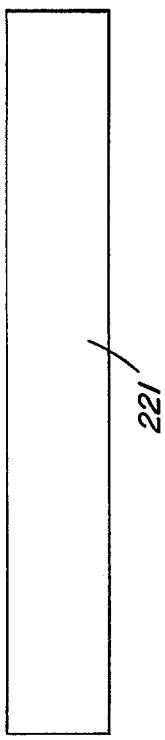
FIG. 10 is a plan view of the wider metal strip utilized in the panel assembly of FIG. 8.
Figure 11:
FIG. 11 is a plan view of the narrow metal strip utilized in the solar energy collector panel assembly illustrated in FIG. 8.
Figure 8:
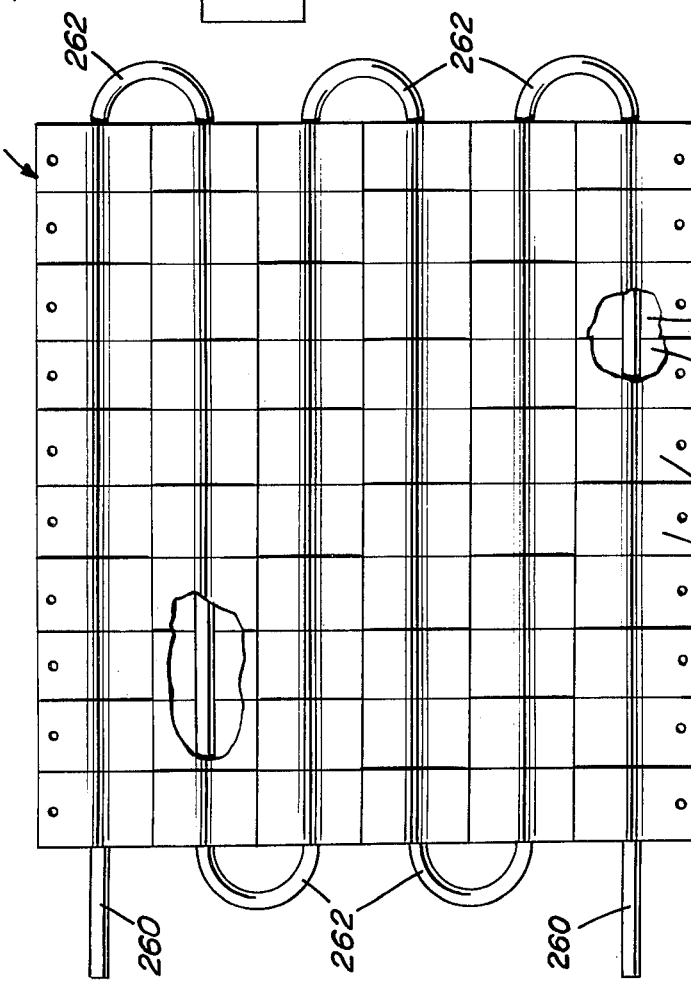
FIG. 8 is a plan view similar to FIG. 3 but illustrating a third form of solar energy collector panel assembly.
Figure 9:
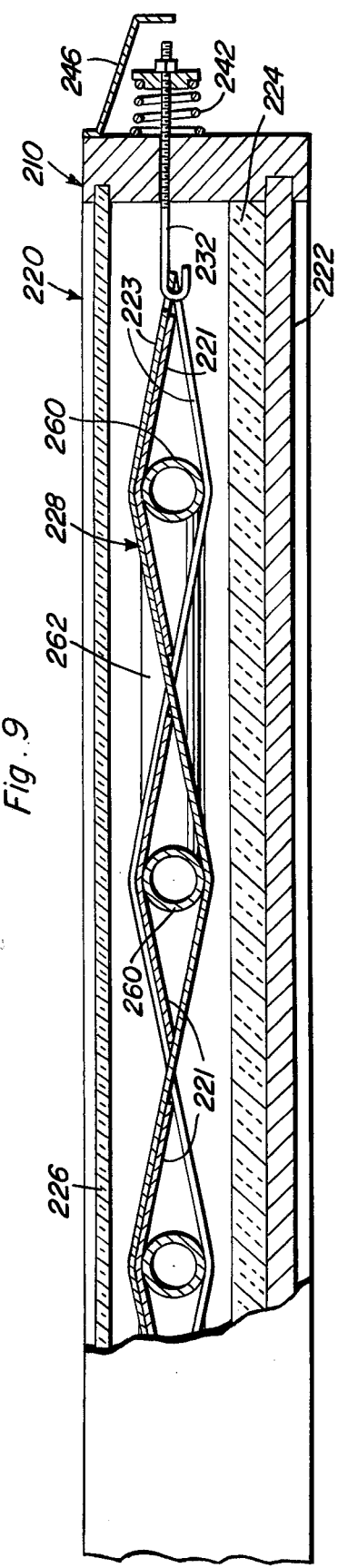
FIG. 9 is a fragmentary vertical sectional view similar to FIG. 2 but illustrating the solar energy collector constructed with the panel assembly illustrated in FIG. 8.

With attention invited now more specifically to FIGS. 5 through 7 of the drawings there will be seen a second form of solar energy collector referred to in general by the reference numeral 110. The collector 110 is similar in many respects to the collector 10 and the various components of the collector 110 corresponding to similar components of the collector 10 are therefore designated by corresponding numerals in the 100 series.

The main difference between the collector 110 and the collector 10 is that the collector 110 includes side-by-side metal strips 111 which overlie the pipe sections 160 and the pipe sections 160 as well as the strips 111 are interposed between opposite side plies of a woven mesh panel 113 which may be in the form of chain link fencing. In addition, instead of the strips 111 being lengthwise tensioned by the springs 142, the hooked end portions 134 of the hooks 132 are engaged with opposite side marginal portions of the woven mesh panel 113. In this manner, the opposite side plies of the woven mesh panel 113 are tensioned by the springs 142 and the ply of the woven mesh panel 113 which overlies the upper surfaces of the strips 111 causes the strips 111 to be bowed over the pipe sections 160. Thus, the contact between the longitudinal mid-portions of the strips 111 and the opposing surfaces of the pipe sections 160 is greatly increased.

Referring now more specifically to FIGS. 8 through 11 of the drawings, there will be seen a third form of solar energy collector referred to in general by the reference numeral 210 and whose components corresponding to various of the components of the solar energy collector 10 are referred to by corresponding numerals in the 200 series.

The panel 228 differs from the panel 28 in that the pipe sections have a first set of wide metal strips 221 extending therealong and disposed over the upwardly facing sides of the pipe sections 260. Then, thinner metal strips 223 are alternately oppositely woven transversely over and under the strips 221 and the pipe sections 260. The remote ends of the strips 223 are apertured as at 225 and hooks 232 corresponding to the hooks 32 are utilized to lengthwise tension the strips 223 between the side walls of the housing 220.

It will be noted that both the strips 221 and one set of the strips 223 are bowed over the upper surfaces of the pipe sections 260 and accordingly that the area of contact between the pipe sections 260 and the strips 221 as well as the strips 223 is greatly increased. Otherwise, the solar energy collector 210 functions in substantially the same manner as the solar energy collectors 110 and 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a solar heater, a plurality of elongated side-by-side thin metal strips, a plurality of elongated cylindrical pipe sections underlying said strips and interconnected to define a continuous liquid flow path through said pipe sections, said metal strips being arched over and disposed in good heat transfer relation with the adjacent portions of said pipe sections opposing said strips, the arching of said strips being such as to closely conform to the radii of curvature of said adjacent pipe section portions and establish a wide area of good heat transfer relationship between said adjacent pipe section portions and said strips, a woven mesh fabric including crossed interwoven opposite side plies, said pipe sections paralleling said strips, said strips and pipe sections being interposed between the opposite side plies of said woven mesh fabric.

2. The combination of claim 1 wherein said woven mesh fabric comprises wire fencing.

3. The combination of claim 2 wherein said wire fencing is tensioned transversely of said strips.

4. In a solar heater, a plurality of elongated side-by-side thin metal strips, a plurality of elongated cylindrical pipe sections underlying said strips and interconnected to define a continuous liquid flow path through said pipe sections, said metal strips being arched over and disposed in good heat transfer relation with the adjacent portions of said pipe sections opposing said strips, the arching of said strips being such as to closely conform to the radii of curvature of said adjacent pipe section portions and establish a wide area of good heat transfer relationship between said adjacent pipe section portions and said strips, said pipe sections paralleling said strips and the latter comprise one set of two sets of side-by-side strips, said sets of strips being interwoven with each other with the strips of each set disposed transverse to the strips of the other set.

5. The combination of claim 4 wherein said pipe sections are disposed beneath corresponding sides of one set of said strips and the other set of strips are longitudinally tensioned.

6. The combination of claim 1 wherein said strips extend transversely of said pipe sections.

7. In a solar heater, a plurality of elongated side-by-side thin metal strips, a plurality of elongated cylindrical pipe sections underlying said strips and interconnected to define a continuous liquid flow path through said pipe sections, said metal strips being arched over and disposed in good heat transfer relation with the adjacent portions of said pipe sections opposing said strips, the arching of said strips being such as to closely conform to the radii of curvature of said adjacent pipe section portions and establish a wide area of good heat transfer relationship between said adjacent pipe section portions and said strips, said strips extending transversely of said pipe sections, and strips including double ply strips with portions of said plies bowed apart at points spaced therealong and receiving said pipe sections therebetween.

8. The combination of claim 7 wherein each of said plies includes end overlapped elongated ply sections secured together, said bowed apart ply portions each comprising a pair of overlapped ply section ends.

9. The combination of claim 8 including heat sink compound means adhering each pair of overlapped ply section ends defining one of said bowed apart ply sections together and said pipe sections to the adjacent ply section end.

10. The combination of claim 8 wherein said metal strips comprise end overlapped aluminum can bodies having adjacent overlapped ends secured together.

* * * * *